United States Patent [19]

Hoffman

[11] Patent Number: 4,752,763
[45] Date of Patent: Jun. 21, 1988

[54] BINARY COMPARISON CIRCUIT WITH SELECTABLE BINARY DIGIT OVERRIDE

[75] Inventor: Nicholas O. Hoffman, Santa Ana, Calif.

[73] Assignee: MAI Basic Four, Inc., New York, N.Y.

[21] Appl. No.: 884,429

[22] Filed: Jul. 11, 1986

[51] Int. Cl.⁴ .............................................. G06F 7/02
[52] U.S. Cl. ................................................ 340/146.2
[58] Field of Search ...................... 364/715; 340/146.2; 364/900 MS File, 769, 745, 748

[56] References Cited

U.S. PATENT DOCUMENTS 4,296,475 10/1981 Nederlof et al. ..................... 364/900
4,340,940 7/1982 Williams, Jr. et al. ...... 340/146.2 X
4,400,794 8/1983 Koos ................................. 364/900
4,675,646 6/1987 Lauer .............................. 340/146.2

Primary Examiner—Gary V. Harkcom
Assistant Examiner—Tan V. Mai
Attorney, Agent, or Firm—Amster, Rothstein & Ebenstein

[57] ABSTRACT

A binary comparison circuit in which the comparison of individual bits of binary signals can be overridden, with the comparisons of the remaining non-overridden bits determining logical equivalence of the binary signals. This enables the binary signals being compared to be analyzed when they are not fully logically equivalent. In the preferred embodiment, the comparisons of all but the least significant bit are overridable. The circuit may be constructed by programming PAL (Programmable Array Logic) devices.

9 Claims, 2 Drawing Sheets

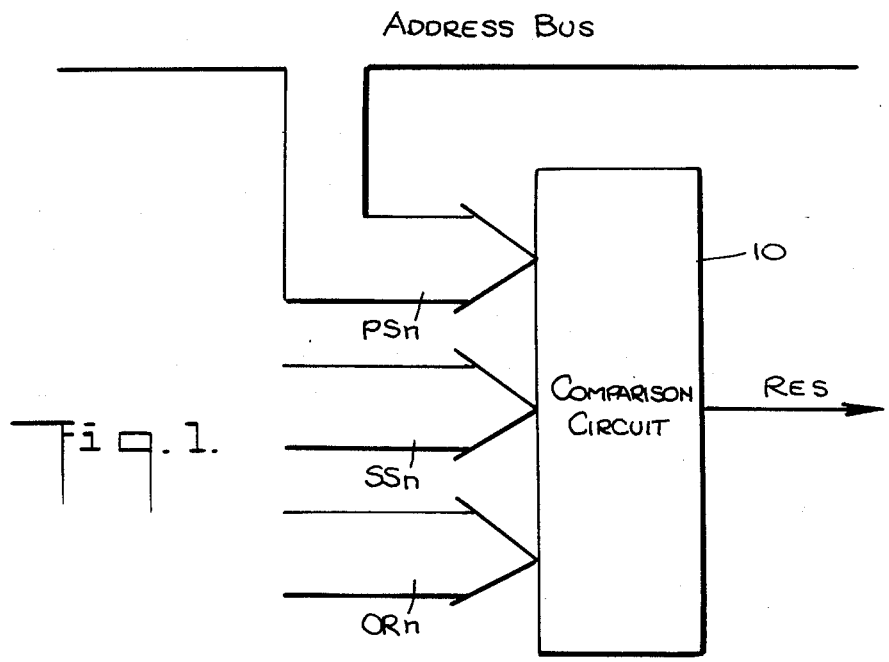
Fig. 1.
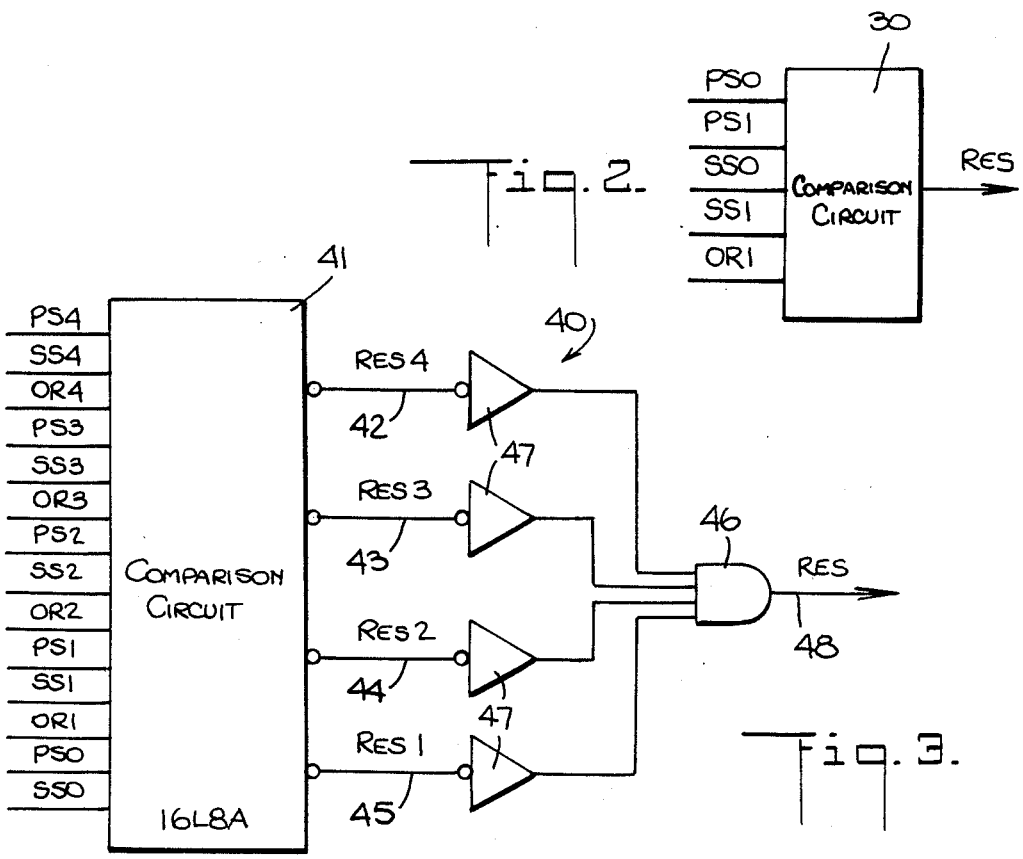
Fig. 2.
Fig. 3.

BINARY COMPARISON CIRCUIT WITH SELECTABLE BINARY DIGIT OVERRIDE

BACKGROUND OF THE INVENTION

The present invention relates to a circuit for analyzing and comparing binary signals.

Comparison circuits for comparing binary signals are well known in the art. These comparison circuits compare two binary signal sets, respective bit by respective bit, and provide an indication of whether the binary signal sets are logically the same or not, i.e., whether all the respective bits of each binary signal set are logically the same. The result that the two binary signal sets are not the same is obtained irrespective of whether all respective bits of the two signal sets are not the same, or if only one or less than all of the respective bits of the two signal sets are not the same. Thus, it is not possible to ascertain from the output of such comparison circuits information relative to the comparison of individual respective bits of the two signal sets, or information relative to portions of the two signal sets.

For example, if it is desired in a computer system to determine the existence of a specified address on an address bus, a comparison circuit loaded with the specified address is coupled to the address bus and indicates whether the specified address was present on the bus or not. If the specified address was not present, it was not possible to analyze the addresses present on the bus in an attempt to determine what was occurring. Therefore, should the exact address be found to be non-existent, it was not possible for the user to determine simply from the comparison circuit what was taking place on the address bus, i.e., whether there was an address logically close to the specified address.

So far as applicant is aware, comparison circuits which compare binary signal sets to, and which also permit analysis of the comparison of individual respective bits of the signal sets, are not commercially available. While it might be possible to utilize existing integrated comparison circuits and an array of gates cascading the comparison circuits, such an arrangement would generate intolerable propagation delays and therefore be unacceptable.

Thus, there is a need for a circuit in which comparison of individual respective bits of the two signal sets being compared, or portions of the two signal sets being compared, can be analyzed, as well as for determining whether the two binary signal sets are logically the same or not.

OBJECTS AND SUMMARY OF THE INVENTION

It is an object of the present invention to provide a circuit which permits analysis of individual respective bits and/or portions of binary signal sets as well as a logical comparison of the composite binary signal sets themselves.

It is another object of the present invention to provide a circuit in which the results of comparisons of individual respective bits of binary signal sets can be overridden and comparison made of the remaining respective portions of the signal sets.

The above and other objects are achieved by the invention disclosed herein which provides a circuit which compares binary signal sets and which permits an analysis of individual respective bits and/or portions of the signal sets being compared. The circuit permits one or more but not all of the comparisons of respective bits of the binary signal sets to be overridden.

According to a specific embodiment, the circuit logically compares a primary binary input signal set to a secondary binary input signal set in a logical matter, and if both signal sets are logically the same and no comparisons are overridden, an output binary signal of a given level is provided. The given level output signal is also provided if the comparison(s) of one or more respective sets of bits of the primary and secondary input signal sets are overridden, regardless of whether the respective sets of bits of the overridden comparison(s) are logically the same or not, and the remaining set(s) of bits of the primary and secondary input signals whose comparison(s) are not overridden are logically the same. In a specific embodiment, the results of the comparisons of all but the respective least significant bits are overridable, i.e. the comparison of the least significant bit is not overridable.

For example, the circuit may comprise a logic circuit which has first, second, third, fourth and fifth inputs, each for receiving a binary signal, and an output. The first and fourth signal inputs receive input signals corresponding to the primary (PSn) signal set to be compared, and the second and fifth signal inputs receive input signals corresponding to the secondary (SSn) input signal set, with respective bits of the two sets being compared. The third signal input receives a signal corresponding to the override (ORn) input signal. The logic circuit provides binary output signals on the output in accordance with Table 1 below. The logic circuit means preferably consists of a single integrated circuit chip. As Table 1 demonstrates, the comparison of a respective pair of bits of the primary and secondary input signals (comparison of fourth and fifth input signals) is not overrideable.

Circuits may be constructed as described below, for example, which compare signal sets having more than two bits each, and the comparison(s) of respective bits which are overrideable may be selected.

A comparison circuit according to the invention has been constructed from a commercially available Programmable Array Logic (PAL) device, for example, type 16L8.

The above and other objects, features, advantages and aspects of the invention will be more readily perceived from the following description of the preferred embodiments taken with the accompanying drawings and appended claims.

BRIEF DESCRIPTION OF THE DRAWINGS

The present invention is illustrated by way of example and not limitation in the figures of the accompanying drawings, in which like references refer to like parts, and in which:

FIG. 1 is a block diagram showing connection of a comparison circuit according to the invention to the address bus of a computer system;

FIG. 2 is a block diagram of the comparison circuit according to the invention for comparing a primary binary signal set and a secondary binary signal set;

FIG. 3 is a block diagram of a 5-bit comparison circuit according to the invention for comparing 5-bit primary and secondary binary signal sets.

DESCRIPTION OF THE PREFERRED EMBODIMENTS

Figure 4:
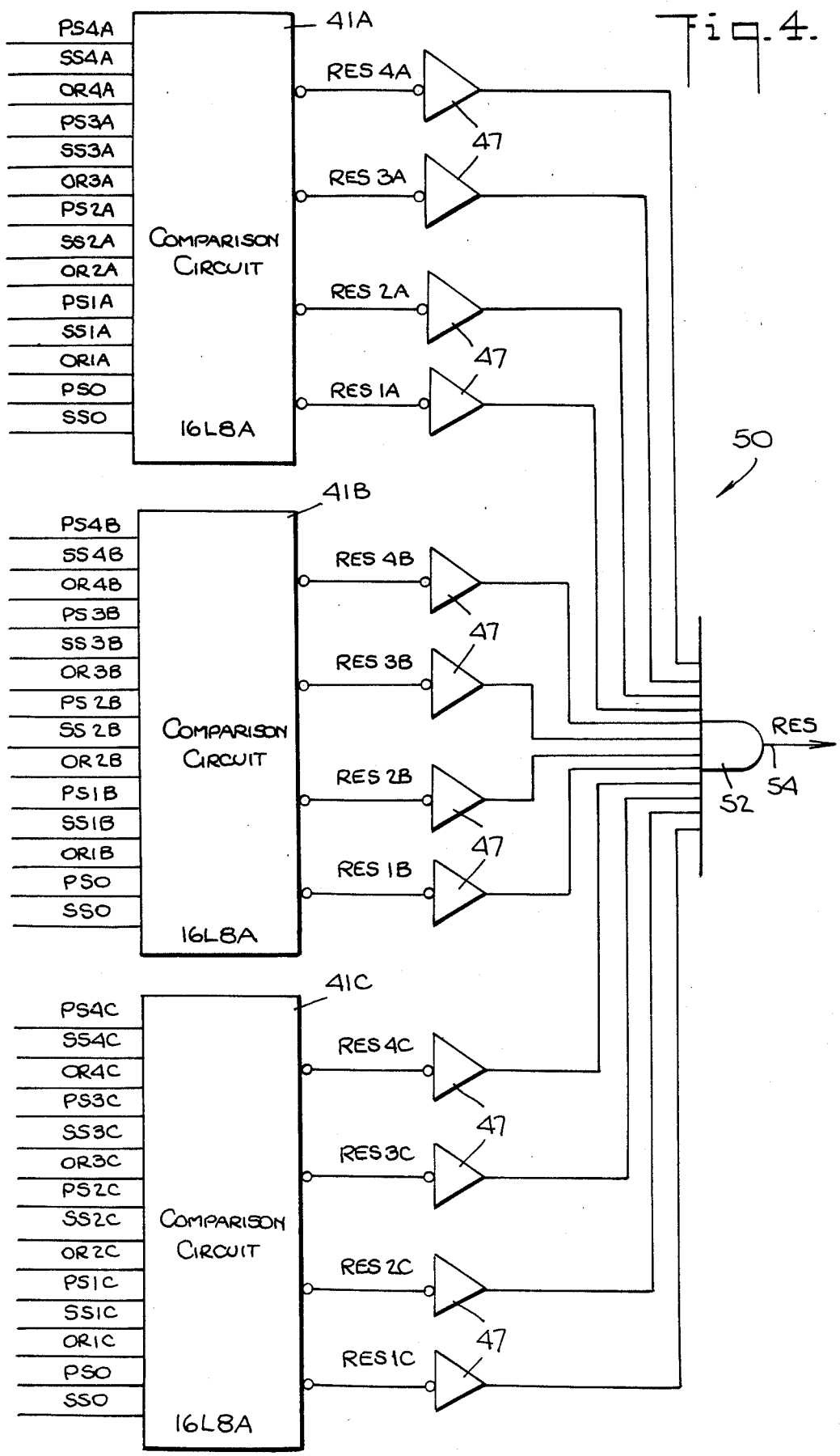
FIG. 4 is a block diagram of an 13-bit comparison circuit according to the invention made up of three comparison circuits as depicted in FIG. 3.

Referring to FIG. 1, the comparison circuit 10 according to the invention includes three sets of inputs for receiving input signals PSn, SSn, and ORn, and an output RES. These input signals are defined as follows:

PSn: Primary signal inputs which are to be compared, where n denotes the specific bit position of respective bits PS0, PS1, PS2, . . . PSn.

PS0: The least significant bit of the primary signal inputs.

SSn: Secondary signal inputs to be compared with the primary signal inputs, where n denotes the specific bit position of respective bits SS0, SS1, SS2, . . . SSn.

SS0: The least significant bit of the secondary signal inputs.

ORn: Override signal inputs, where n denotes the specific bit position of the respective override signal bits OR1, OR2, . . . ORn.

The input which receives signal sets PSn may be coupled to, for example, an address bus of a computer system whose addresses it is desired to analyze. The inputs which receive signal set SSn may receive a preselected binary signal set, representing, for example, an address whose existence on the address bus it is desired to determine. The inputs which receive signal set ORn are coupled to receive override signals for overriding the comparisons of respective bits in the input signal sets PSn and SSn. Comparison circuit 10 provides an output RES of a given binary level to indicate complete logical equivalent of the input signal sets PSn and SSn when all respective bits are exactly equivalent and no override signal is provided, or if an override signal is provided, to provide an output RES of the given binary level when respective non-overriden portions of the input signal sets PSn and SSn are logically equivalent. Thus, if it desired to determine the existence of a given address on the address bus, that address is provided on an input signal set SSn to comparison circuit 10, and if the logically equivalent signal set PSn exists exactly on the address bus, then comparison circuit 10 will provide the output RES of the given binary level. If the exact address does not exist, and no override signal is provided, then an output RES of the given level will not be provided. If the specified address is not present on the address bus, selected comparisons of bit pairs can be made to determine whether there is a logical equivalence of portions of input signal sets PSn and SSn, i.e. whether there is an address present which is logically close to the specified address.

Referring now to FIG. 2, a comparison circuit 30 according to the invention is depicted which compares 2-bit primary input signal set PS0, PS1 and 2-bit secondary input signal set SS0, SS1, i.e., PS1 (first input signal) and SS1 (second input signal) are compared and PS0 (fourth input signal) and SS0 (fifth input signal) are compared, with the comparison of the respective most significant bits PS1, SS1 of the two signal sets being overridable when the override signal OR1 is asserted (i.e. a given logic level). The comparison of the least significant bits PS0 and SS0 is not overridable. The output or result signal RES will therefore always depend on whether there is logical equivalence between PS0 and SS0. The override signal OR1 when asserted will cause the output of circuit 30 to be asserted (i.e. a given logic level) only upon the logical equivalence of the PS0 and SS0 input signals regardless of whether there is logical equivalence between the PS1 and SS1 input signals.

FIG. 3 depicts a multi-bit comparison circuit 40 according to the invention. The input signals to multi-bit comparison circuit 40 are defined as above for FIG. 1. In addition, RESn has the following definition:

RESn: The result output signal for each respective binary pair comparison and comparison of a non-overridable (e.g. the least significant bit) binary pair.

Respective bit positions for the primary, secondary and override signal set are denoted by the value of n. Thus, PS1 and SS1 are compared and the result can be overridden when OR1 is asserted. Each result signal also corresponds to a respective comparison by means of the value of n. Thus, RES1 is a result of the comparison between PS1 and SS1 (and PS0 and SS0); RES2 is the result of the comparison between PS2 and SS2 (and PS0 and SS0); etc.

The comparison circuit 40 includes logic circuit 41 which provides the input/output relationship defined by the truth table set forth in Table 1 below.

TABLE 1

| INPUTS | | | | | OUTPUTS |
|---|---|---|---|---|---|
| PSn (First) | SSn (Second) | ORn (Third) | PS0 (Fourth) | SS0 (Fifth) | RESn (Output) |
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 0 |
| X | X | 1 | 0 | 0 | 0 |
| X | X | 1 | 0 | 1 | 1 |
| X | X | 1 | 1 | 0 | 1 |
| X | X | 1 | 1 | 1 | 0 |
| 0 | 1 | 0 | 0 | 0 | 1 |
| 0 | 1 | 0 | 0 | 1 | 1 |
| 0 | 1 | 0 | 1 | 0 | 1 |
| 0 | 1 | 0 | 1 | 1 | 1 |
| 1 | 0 | 0 | 0 | 0 | 1 |
| 1 | 0 | 0 | 0 | 1 | 1 |
| 1 | 0 | 0 | 1 | 0 | 1 |
| 1 | 0 | 0 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 0 |

"X" signifies a don't care, "1" signifies a logical 1 or high state, "0" signifies a logical 0 or low state.

The equations which describe the truth table of TABLE 1 are as follows, where "/" signifies the signal is a logical 0; "*" signifies the AND function; "+" signifies the OR function; and "n" signifies the respective bit positions of the signals.

| /REsn = | /ORn * | SSn * | PSn * | PS0 * | SS0 |
|---|---|---|---|---|---|
| + | /ORn * | SSn * | PSn * | /PS0 * | /SS0 |
| + | /ORn * | /SSn * | /PSn * | PS0 * | SS0 |
| + | /ORn * | /SSn * | /PSn * | /PS0 * | /SS0 |
| + | ORn * | | | PS0 * | SS0 |
| + | ORn * | | | /PS0 * | /SS0 |

Comparison circuit 40 of FIG. 3, which includes four FIG. 2 function circuit blocks 30 (not shown in FIG. 4), compares 4-bit primary and secondary signal sets (and a fifth, least significant bit) and includes a 16L8A PAL device 41 programmed according to the above equation for n=4, 3, 2, 1. PAL device 41 includes four outputs, 42, 43, 44 and 45, on which result signals RES4, RES3, RES2 and RES1, are respectively output, and which are coupled to AND gate 46 through respective inverters 47. The output 48 from AND gate 46 is the output of the overall comparison circuit 40 and provides the RES output signal.

Logic circuit 41 operates as follows. If OR4 is not asserted, RES4 will not be asserted unless PS0 and SS0 are logically equivalent and also PS4 and SS4 are logically equivalent. If OR4 is asserted, RES4 will be asserted if PS0 and SS0 are logically equivalent regardless of whether PS4 and SS4 are logically equivalent. The same applies respectively to PS3, SS3 PS0, SS0 and OR3; PS2, SS2, PS0, SS0 and OR2; and PS1, SS1, PS0, SS0 and OR1. Thus, the output of AND gate 46 will be asserted (RES) if PS0 and SS0 are logically equivalent and in accordance with the logical equivalence of the respective primary and secondary signal sets and assertion of override signals. However, for output 48 to be asserted, PS0 and SS0 must in all cases be logically equivalent.

FIG. 4 depicts a comparison circuit 50 comprising three FIG. 3 16L8 PAL logic 41A, 41B, 41C coupled to AND gate 52 through inverters 47. The output of circuit 50, on which the result signal RES is provided, is output 54 of AND gate 52. The three PAL devices 41A, 41B, 41C were programmed with the above equation for n=4, 3, 2, 1.

The signals of the primary signal set PSn may be static or active address signals which change with time. The signals of the secondary signal set SSn may be static signals which are latched into data latches. However, the secondary signals may also change with time, if desired. The override signals ORn may also be static signals although they could be active signals as well. With active sets of input signals, the result can be timed to occur after the last input signal arrives. In such a case, it is preferred to use a clock signal as at least one of the PS0 or SS0 signals (FIG. 4) to provide a time frame reference for the comparison. The remaining PS0 or SS0 signals can be grounded or connected to a high logic level to define the part of the clock cycle used for the compare function, or they may be a controlled (active) signals in a complex design. It is also possible to permit PSn and SSn to be active and ORn to be selected at the time the compare is to take place, thereby always asserting RESn accept during compare when a valid RESn may be read as logical 1 or logical 0. The PS0 and SS0 signals may be deleted to make a comparator with override capability for all bits. An advantage of this is the elimination of a separate stage for the override functions which would add to the delay from the input to resultant output. If desired, the PAL devices can be programmed to make any selected comparisons overridable.

Certain changes and modifications to the embodiments disclosed herein will be apparent to those skilled in the art. It is the applicant's intention to cover by the claims all such modifications and changes which can be made to the embodiments chosen herein for purposes of disclosure which do not depart from the spirit and scope of the invention.

What is claimed is:

1. A circuit comprising:
   logic circuit means having first, second, third, fourth and fifth inputs, each input for receiving a binary signal and an output for providing a binary signal, the logic circuit means providing binary output signals on the output in response to binary input signals on the inputs in accordance with the following truth table, in which: "1" signifies a logical 1 or high logic level; "0" signifies a logical 0 or low logic level; and "x" signifies a "1" or a "0", i.e., a "dont't care":

| First | Second | Third | Fourth | Fifth | Output |
|-------|--------|-------|--------|-------|--------|
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 0 |
| X | X | 1 | 0 | 0 | 0 |
| X | X | 1 | 0 | 1 | 1 |
| X | X | 1 | 1 | 0 | 1 |
| X | X | 1 | 1 | 1 | 0 |
| 0 | 1 | 0 | 0 | 0 | 1 |
| 0 | 1 | 0 | 0 | 1 | 1 |
| 0 | 1 | 0 | 1 | 0 | 1 |
| 0 | 1 | 0 | 1 | 1 | 1 |
| 1 | 0 | 0 | 0 | 0 | 1 |
| 1 | 0 | 0 | 0 | 1 | 1 |
| 1 | 0 | 0 | 1 | 0 | 1 |
| 1 | 0 | 0 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 0. |

2. The circuit according to claim 1 wherein the logic circuit means consists of a single integrated circuit chip.

3. A circuit comprising:
   logic circuit means having a plurality of sets of first, second and third inputs each for receiving binary signals, and fourth and fifth inputs each for receiving a binary signal, and an output for each set of first, second and third inputs for providing binary signals;
   the logic circuit means providing binary signals to each output in response to the binary signals on the respective set of first, second and third inputs and in response to the binary signals on the fourth and fifth inputs in accordance with the truth table below, in which: "1" signifies a logical 1 or high logic level; "0" signifies a logical 0 or low level; and "x" signifies a "1" or a "0", i.e. a "dont't care"; and
   an AND circuit having inputs coupled to each of said outputs and an output which is the output of the overall circuit

| First | Second | Third | Fourth | Fifth | Output |
|-------|--------|-------|--------|-------|--------|
| 0 | 0 | 0 | 0 | 0 | 0 |
| 0 | 0 | 0 | 0 | 1 | 1 |
| 0 | 0 | 0 | 1 | 0 | 1 |
| 0 | 0 | 0 | 1 | 1 | 0 |
| X | X | 1 | 0 | 0 | 0 |
| X | X | 1 | 0 | 1 | 1 |
| X | X | 1 | 1 | 0 | 1 |
| X | X | 1 | 1 | 1 | 0 |
| 0 | 1 | 0 | 0 | 0 | 1 |
| 0 | 1 | 0 | 0 | 1 | 1 |
| 0 | 1 | 0 | 1 | 0 | 1 |
| 0 | 1 | 0 | 1 | 1 | 1 |
| 1 | 0 | 0 | 0 | 0 | 1 |
| 1 | 0 | 0 | 0 | 1 | 1 |
| 1 | 0 | 0 | 1 | 0 | 1 |
| 1 | 0 | 0 | 1 | 1 | 1 |
| 1 | 1 | 0 | 0 | 0 | 0 |
| 1 | 1 | 0 | 0 | 1 | 1 |
| 1 | 1 | 0 | 1 | 0 | 1 |
| 1 | 1 | 0 | 1 | 1 | 0. |

4. The circuit according to claim 3 wherein the logic circuit means consists of a single integrated circuit chip.

5. A circuit comprising:

logic circuit means having first, second, third, fourth and fifth inputs each for receiving binary logic signals and an output, said logic circuit means providing:

(a) a binary signal of a first logic level on the output in response to a binary signal on the third input of the first logic level and binary signals on the first and second inputs of the same logic level and binary signals on the fourth and fifth inputs of the same logic level and a binary signal of a second logic level on the output in response to binary signals on the first and second inputs which are not of the same logic level and on the fourth and fifth inputs which are not of the same logic level;

(b) a binary signal of the first logic level on the output in response to a binary signal on the third input of the second logic level and binary signals on the fourth and fifth inputs of the same logic level regardless of the binary signals on the first and second inputs;

(c) a binary signal of the second logic level on the output in response to a binary signal of the first logic level on the third input and binary signals on the first and second inputs which are of the same logic level and binary signals on the fourth and fifth inputs which are not of the same logic level, or binary signals on the first and second inputs which are not of the same logic level and binary inputs on the fourth and fifth inputs which are of the same logic level; and (d) a binary signal of the second logic level on the output in response to a binary signal of the second logic level on the third input and binary signals on the fourth and fifth inputs which are of different logic levels regardless of the binary signals on the first and second inputs.

6. The circuit according to claim 5 wherein there are a plurality of sets of the inputs.

7. A comparator comprising:

logic circuit means having first, second, third, fourth and fifth inputs for receiving binary logic signals; and an output;

the logic circuit means including means for comparing the binary signals on the first and second inputs and for comparing the binary signals on the fourth and fifth inputs and for providing a binary signal of a first logic level on the output when the binary signal on the first and second inputs are the same and when the binary signals on the fourth and fifth inputs are the same, and for overriding the comparison of the binary signals on the first and second inputs in response to a binary signal of a preselected logic level on the third input.

8. The comparator according to claim 7 wherein there are a plurality of sets of first, second and third inputs.

9. A binary comparator circuit comprising a single integrated circuit chip including, at least first and second primary signal inputs and at least first and second secondary signal inputs related to the first and second primary signal inputs, the circuit logically comparing respective primary and secondary binary input signals on the respective signal inputs, at least one override signal input for overriding the comparison of input signals on respective first primary and secondary signal inputs, and at least one output, the circuit providing a given logic level at the at least one output when the binary input signals on the respective first and second primary and secondary signal inputs are logically the same and an override signal is provided on the override signal input regardless of whether the binary signal inputs on respective first primary and first secondary signal inputs are logically the same or not.

* * * * *